June 20, 1961  B. H. THUNELL  2,989,095
FRAME SAWS
Filed May 9, 1958
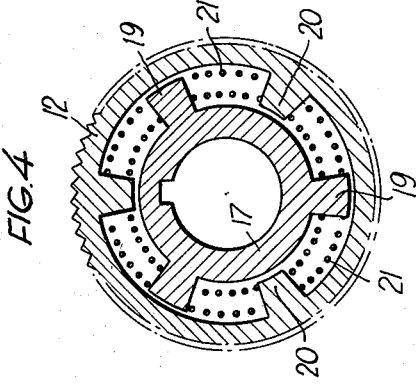
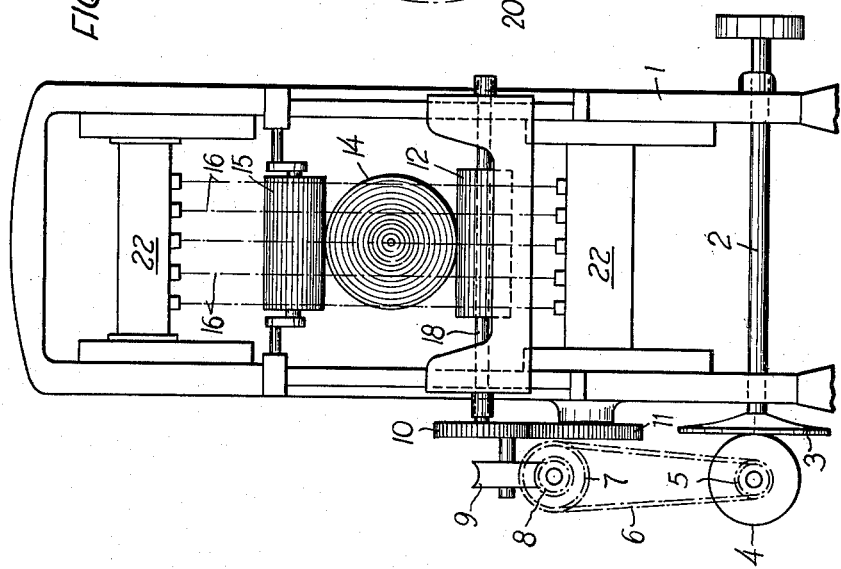
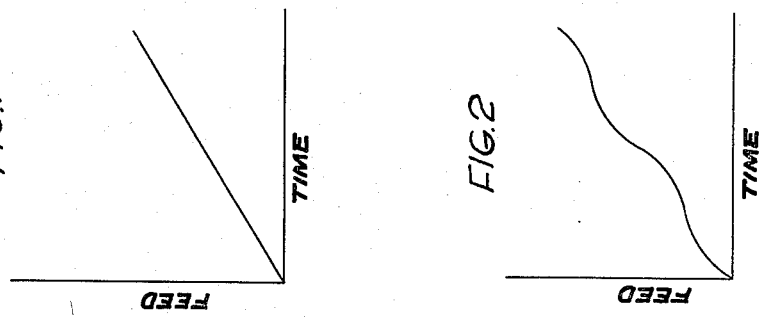
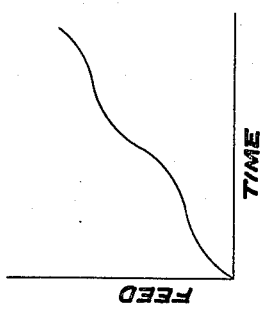

United States Patent Office 2,989,095
Patented June 20, 1961

1

2,989,095
FRAME SAWS
Bertil Henry Thunell, Stocksund, Sweden, assignor to Soderhamns Verkstader Aktiebolag, Soderhamn, Sweden, a corporation of Sweden
Filed May 9, 1958, Ser. No. 734,277
Claims priority, application Sweden May 13, 1957
2 Claims. (Cl. 143—84)

This invention relates to frame-saws also known as gang saw machines having feed rollers for advancing a log during the sawing operation.

The object of the invention is to provide means for levelling the variations in the stresses acting upon the saw blades during their reciprocating movement. This object is attained by mechanism described with reference to the annexed drawing.

In the drawing, FIGS. 1 and 2 are diagrams, FIG. 3 is a front elevation of a frame-saw, and FIG. 4 a cross-sectional view of a feed roller having inserted therein a resilient coupling.

In the ideal case of forward movement of logs through a reciprocating saw-frame, the feed velocity is constant. In such case the feed is represented by a straight line in a feed-time-diagram, as shown in FIG. 1. Various kinds of feed mechanism are known in the art. Previously, intermittent feed has been customary. To this end, a feed mechanism comprising feed-pawls and ratchet wheels has been provided between the drive motor and the feed rollers. The feed-pawls performed a reciprocating movement and actuated the ratchet wheel such as to revolve the feed rollers in an intermittent manner. In such a mechanism the feed velocity is rather limited and amounts to about one-fifth of an inch per second. Since then, further developments have been achieved in intermittently operating feed mechanisms to adapt the movement of the log to the cutting velocity which varies during the stroke of the saw-frame. In modern gang saw machines designed for high output capacity, continuous feed movement is preferred. FIG. 3 illustrates an example of a driving mechanism for this purpose. At the lower end of a stationary frame 1 is mounted a drive shaft 2 which, by means of a continuously variable change speed friction gear including a driving pulley 3 secured to the drive shaft and a driven pulley 4 movable towards and away from the center of the driving pulley, drives a chain gear 5, 6, 7, a worm gear 8, 9 and gear wheels 10, 11 which in turn drive the feed rollers 12 and, by means of a crank mechanism, not shown but of conventional construction, reciprocate the saw-frame 22. During its advancing movement, the log 14 rests on the feed rollers and is kept in engagement therewith by means of an overhead pressure roller 15. The saw blades inserted into the reciprocating frame 22 are denoted by chain-dotted lines 16. The friction-drive mechanism for the frame may be replaced by an electric drive mechanism including a separate electric motor or by a hydraulic drive mechanism.

In a drive mechanism of the kind described for obtaining a continuous feed movement, the feed rollers are rotated at constant speed and consequently advance the log both during the upward and downward movement of the saw blades. As a result of the mechanics of movement of the reciprocating frame, the feed will not be an ideal one as shown in FIG. 1, but will be represented by the undulated curve according to FIG. 2. In other words, the forward movement will be irregular, resulting in high stresses on the drive mechanism and saw blades and in

2 power losses and impairment of the engagement between the feed rollers and the log. This inconvenience is avoided by the invention according to which a resilient coupling is provided in the drive mechanism so as to level the above named variations. To make the best possible use of the principle according to the invention, levelling of the variations should take place as close to the log as possible. FIG. 4 shows an example of such a resilient coupling provided within a feed roller.

The tubular feed roller 12 houses a hub 17 adapted to be keyed onto the shaft 18 of the feed roller (FIG. 3) and having outwardly extending projections 19. Between these projections and similar projections 20 extending inwardly from the rim of the roller 12 there are inserted springs 21. As indicated in FIG. 4 the ends of projections 19 are spaced slightly from the inner periphery of roller 12 and the ends of projections 20 are similarly slightly spaced from the outer periphery of hub 17 to establish the clearance necessary to permit relative rotation between the outer roller portion 12 and the inner hub 17 but without involving any appreciable relative radial displacement therebetween. During the sawing operation the hub keyed onto the shaft rotates at a constant speed and tends to transmit its movement by means of the springs 21 to the roller 12 which engages the log. If the log is prevented from moving at constant speed in the direction of feed, the hub and the roller will perform an angular movement relative each other, and the springs will be compressed or expanded.

What I claim is:

1. A gang saw machine comprising a reciprocating frame, saw blades mounted in said frame for sawing a log into a plurality of planks at one pass of the log through the reciprocating saw blades, and feed roll means for feeding a log through said blades, said feed roll means comprising an outer driven tubular feed roller adapted to establish a feeding engagement with the log, a driving hub mounted concentrically within said tubular feed roller, peripheral portions of said driving hub being of substantially the same diameter as peripheral portions of the inner periphery of said tubular feed roller to thereby prevent any relative radial displacement therebetween, circumferentially spaced abutment faces on said tubular feed roller and driving hub respectively, compressible spring means disposed between said abutment faces on said tubular feed roller and driving hub for imparting a resilient driving torque to said tubular feed roller from said driving hub, said spring means in cooperation with said abutment faces allowing limited relative rotation between said tubular feed roller and driving hub, and means for effecting rotation of said driving hub.

2. A gang saw machine as defined in claim 1 wherein the periphery of said driving hub is substantially cylindrical and includes projections extending radially outward therefrom, the inner periphery of said tubular feed roller is substantially cylindrical and includes projections extending radially inward therefrom, and said abutment faces are located on said projections.

References Cited in the file of this patent
UNITED STATES PATENTS

| 360,677 | Garrigues | Apr. 5, 1887 |
| 404,486 | Hoyt | June 4, 1889 |
| 459,325 | Whitney | Sept. 8, 1891 |
| 487,129 | Saxon | Nov. 29, 1892 |
| 1,838,437 | Moses | Dec. 9, 1931 |
| 2,817,375 | Traben | Dec. 24, 1957 |